(12) United States Patent
Sando

(10) Patent No.: US 7,647,395 B2
(45) Date of Patent: Jan. 12, 2010

(54) TERMINAL MANAGEMENT SYSTEM

(75) Inventor: Keiichi Sando, Tokyo (JP)

(73) Assignee: Oki Data Corporation, Tokyo (JP)

( * ) Notice: Subject to any disclaimer, the term of this patent is extended or adjusted under 35 U.S.C. 154(b) by 362 days.

(21) Appl. No.: 11/488,789

(22) Filed: Jul. 19, 2006

(65) Prior Publication Data

US 2007/0019236 A1    Jan. 25, 2007

(30) Foreign Application Priority Data

Jul. 22, 2005    (JP)    ............... 2005-212137

(51) Int. Cl.
*G06F 15/173*    (2006.01)
*G06F 3/00*    (2006.01)
*G06F 3/12*    (2006.01)

(52) U.S. Cl. .............. 709/223; 709/224; 719/321; 358/1.15

(58) Field of Classification Search ............... None
See application file for complete search history.

(56) References Cited

U.S. PATENT DOCUMENTS

| 7,316,022 | B2 * | 1/2008 | Nishio | 719/321 |
| 7,353,373 | B2 * | 4/2008 | Olbricht | 713/1 |
| 2003/0115302 | A1 * | 6/2003 | Teraoaka et al. | 709/221 |
| 2003/0131072 | A1 * | 7/2003 | Kobayashi | 709/218 |
| 2003/0135549 | A1 * | 7/2003 | Kuno et al. | 709/203 |
| 2004/0057072 | A1 * | 3/2004 | Borchers et al. | 358/1.15 |
| 2004/0190052 | A1 * | 9/2004 | Sando | 358/1.15 |
| 2005/0044200 | A1 * | 2/2005 | Aritomi | 709/223 |

FOREIGN PATENT DOCUMENTS

JP    2004-280218    7/2004

* cited by examiner

*Primary Examiner*—Wen-Tai Lin
(74) *Attorney, Agent, or Firm*—Rabin & Berdo, P.C.

(57) ABSTRACT

A terminal management system includes a terminal apparatus connected to a local network, a management server capable of transmitting and receiving information relating to the terminal apparatus through the local network, and a client terminal capable of receiving the information relating to the terminal apparatus from the management server through the local network. The management server includes a terminal searching section for searching for the terminal apparatus connected to the local network, a terminal information transmitting section for transmitting information relating to this terminal apparatus to the client terminal with reference to information relating to the client terminal, and a driver requesting section for requesting a data server connected to an external network for a driver program for operating the terminal apparatus, in accordance with request information transmitted from the client terminal. The management server transmits an installer and the driver program to the client terminal.

9 Claims, 16 Drawing Sheets

FIG. 8

| PRINTER MODEL NAME | SUPPORT OS | EMULATION | SUPPORT LANGUAGE | VERSION | DRIVER PROGRAM |
|---|---|---|---|---|---|
| PrinterC | OS-A OS-B OS-C | PS | JAPANESE | 1.00 | PR549SJ.cab |
| | | | ENGLISH | 1.10 | PR549SE.cab |
| | | PCL | JAPANESE | 2.00 | PR549CJ.cab |
| | | | ENGLISH | 2.00 | PR549CE.cab |
| | OS-D | PS | JAPANESE | 1.15 | PR54NSJ.cab |
| | | | ENGLISH | 1.10 | PR54NSE.cab |
| | | PCL | JAPANESE | 4.60 | PR54NCJ.cab |
| | | | ENGLISH | 2.30 | PR54NCE.cab |
| | OS-E OS-F OS-G | PS | JAPANESE | 2.20 | PR542SJ.cab |
| | | | ENGLISH | 1.00 | PR542SE.cab |
| | | PCL | JAPANESE | 1.01 | PR542CJ.cab |
| | | | ENGLISH | 2.00 | PR542CE.cab |

FIG. 9

| GROUP | PRINTER IDENTIFIER (MAC ADDRESS) | MODEL NAME | IP ADDRESS |
|---|---|---|---|
| GROUP A (SUBNET:11.11.11.255) | 00:08:00:00:00:00 | PrinterA | 11.11.11.1 |
| | 00:08:00:00:00:01 | PrinterB | 11.11.11.2 |
| GROUP B (SUBNET:11.11.12.255) | 00:08:00:00:00:02 | PrinterC | 11.11.12.1 |

FIG. 10

| GROUP | NAME | EMAIL ADDRESS |
|---|---|---|
| GROUP A (SUBNET:11.11.11.255) | User1 | User1@a.com |
| | User2 | User2@a.com |
| GROUP B (SUBNET:11.11.11.255) | User3 | User3@a.com |
| | | |

FIG. 11

| OS | EMULATION | LANGUAGE |
|---|---|---|
| Windows Me | PS | JAPANESE |
| | | ENGLISH |
| | PCL | JAPANESE |
| | | ENGLISH |
| Windows 2000/XP | PS | JAPANESE |

FIG. 14

| GROUP TREE | | RESOURCE |
|---|---|---|
| ROUTE GROUP | | |
| | SUB GROUP A (SUBNET ATTRIBUTE :11.11.11.255) | PRINTER(MAC: 00:08:00:00:00:00, MODEL NAME : PrinterA, IP ADDRESS : 11.11.11.1) |
| | | PRINTER(MAC: 00:08:00:00:00:01, MODEL NAME : PrinterB, IP ADDRESS : 11.11.11.2) |
| | | USER (NAME : User1, MAIL ADDRESS: user1@a.com) |
| | | USER (NAME : User2, MAIL ADDRESS: user2@a.com) |
| | | CLIENT TERMINAL (NAME : PC1) |
| | | CLIENT TERMINAL (NAME : PC2) |
| | SUB GROUP B (SUBNET ATTRIBUTE :11.11.12.255) | PRINTER(MAC: 00:08:00:00:00:02, MODEL NAME : PrinterC, IP ADDRESS : 11.11.12.1) |
| | | USER (NAME : User3, MAIL ADDRESS: user3@a.com) |
| | | CLIENT TERMINAL (NAME : PC3) |
| | | CLIENT TERMINAL (NAME : PC4) |

FIG. 15

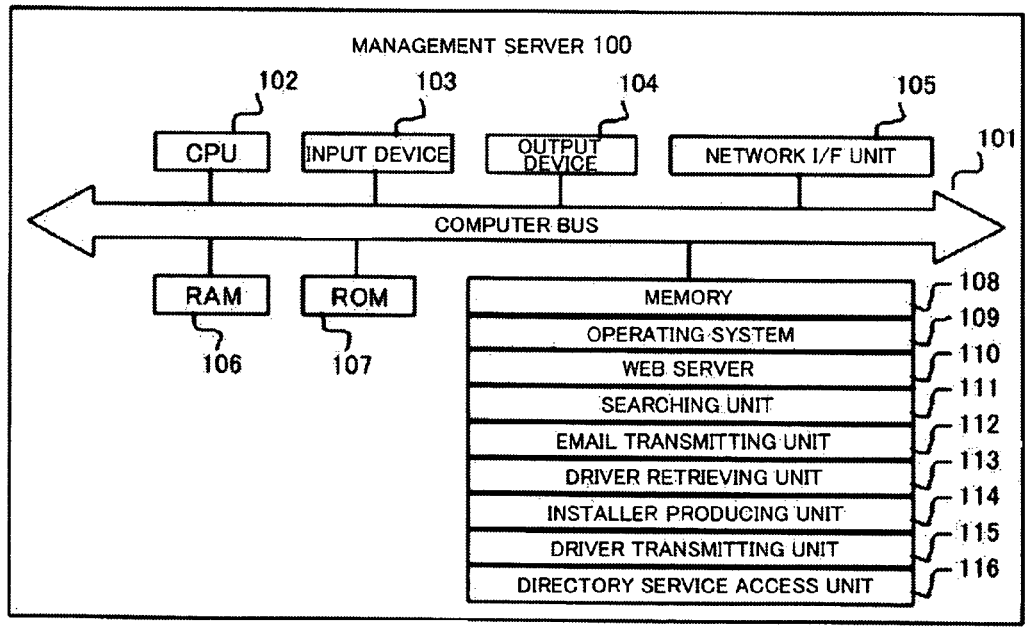

| MODEL NAME | CORRESPONDING OS | LANGUAGE | EMULATION | VERSION | DRIVER RECEPTION FLAG | DRIVER PROGRAM |
|---|---|---|---|---|---|---|
| PrinterA | Windows NT | JAPANESE | PS | 1.00 | 1 | A.cab |
| PrinterB | Windows 2000 | ENGLISH | PCL | 2.00 | 0 | B.cab |
| MFPC | Windows Me | FRENCH | — | 2.10 | 1 | C.cab |

| DRIVER RETRIEVAL SETTING | | | | | |
|---|---|---|---|---|---|
| MODEL NAME | CORRESPONDING OS | CORRESPONDING LANGUAGE | EMULATION | VERSION | SETTING |
| PrinterA | Windows NT | JAPANESE | PCL | 1.00 | RETRIEVE ▽ / NOT RETRIEVE |

| CLIENT TERMINAL NAME | PRINTER MODEL NAME | DRIVER PROGRAM | | | | RESULT |
|---|---|---|---|---|---|---|
| | | SUPPORT OS | SUPPORT LANGUAGE | EMULATION | VERSION | |
| PC1 | PRINTER 5400 | Windows NT | JAPANESE | PCL | 1.00 | OK |
| PC2 | PRINTER 5400 | Windows NT | JAPANESE | PCL | 1.00 | NG |
| PC3 | PRINTER 5400 | Windows NT | JAPANESE | PCL | 1.10 | OK |

TERMINAL MANAGEMENT SYSTEM

BACKGROUND OF THE INVENTION

1. Field of the Invention

This invention relates to a terminal management system including a terminal apparatus connected to a local network capable of transmitting and receiving information, a management server capable of transmitting and receiving information on the terminal apparatus through the local network, and a client terminal capable of receiving the information on the terminal apparatus from the management server through the local network.

2. Description of Related Art

Under the conventional terminal management system having a local network capable of transmitting and receiving information, on which a terminal apparatus such as a printer or the like, a management server capable of transmitting and receiving information on the terminal apparatus through the local network, and a client terminal are connected to one another, the management server reads a driver program for operating the terminal apparatus out of a memory of the management server itself to transmit the driver program to the client terminal according to transmission of request information for requesting the driver program from the client terminal to the management server. The client terminal receives and installs the driver program transmitted from the management server, thereby being in a state capable of operating the terminal apparatus. For example, under a printing system having a network such as a LAN or the like connecting to a print server, a client, a printer, and the like, a shared printer monitor of the print server monitors a shared printer set to be shared on the network, based on shared printer information. In the case of detecting the state such that a new shared printer is connected to the network, the shared printer monitor transmits to the client an email having such a message as requesting installation of the printer driver for the new shared printer. The client then downloads to install the printer driver from the print server (see, e.g., an example of related art).

Japanese Patent Laid-Open Publication No. 2004-280218 (from page 5 to 6, FIG. 1) is an example of related art.

Under the conventional printing system as described above, however, the printer driver for the new printer is to be downloaded from printer drivers stored in the print server, so that the printer drivers are required to be available in the print server every time when the shared printer monitor detects the new printer. To make available of the printer driver, an operator or the like is required to request to acquire the printer driver and then manually store the acquired printer driver in the print server in order to set the printer driver in a downloadable state, thereby resulting in complicated operation.

This invention has been invented in view of the above problems and has an object to provide a terminal management system which can effectively distribute a driver program for a terminal apparatus to a client terminal even in the case where the new terminal apparatus is installed onto the network.

SUMMARY OF THE INVENTION

To accomplish the foregoing objects, a terminal management system according to an aspect of this invention has a terminal apparatus connected to a local network capable of transmitting and receiving information, a management server capable of transmitting and receiving information relating to the terminal apparatus through the local network, and a client terminal capable of receiving the information relating to the terminal apparatus from the management server through the local network, in which the management server includes a terminal searching section for searching for the terminal apparatus connected to the local network, a terminal information transmitting section for transmitting the information relating to the terminal apparatus searched by the terminal searching section to the client terminal with reference to information relating to the client terminal, a driver requesting section for requesting a data server connected to an external network different from the local network for a driver program for operating the terminal apparatus, in accordance with request information transmitted from the client terminal, a driver receiving section for receiving the driver program transmitted from the data server in accordance with the request from the driver requesting section, an installer adding section for adding the driver program received by the driver receiving section to an installer, and an installer transmitting section for transmitting to the client terminal the installer added with the driver program by the installer adding section, and in which the client terminal includes a request information transmitting section for transmitting the request information for requesting the driver program corresponding to the terminal apparatus to the management server in accordance with the information relating to the terminal apparatus transmitted from the management server, and an installing section for installing the driver program transmitted from the management server upon execution of the installer for the driver program.

According to an aspect of the invention, the management server receives the driver program from the data server through the external network according to the request information from the client terminal and produces the installer based on the received driver program to transmit the created installer to the client terminal. Thus, such a process can be omitted from the operator or the like, as acquiring and storing the driver program in the management server to set the driver program in a downloadable state, thereby being able to effectively distribute the driver program.

Furthermore, a management terminal system according to another aspect of this invention has a terminal apparatus connected to a local network capable of transmitting and receiving information, a management server capable of transmitting and receiving information relating to the terminal apparatus through the local network, a resource server memorizing information readable by the management server, and a client terminal capable of receiving the information relating to the terminal apparatus from the management server through the local network, in which the resource server memorizes information relating to the client terminal connected to the local network, in which the management server includes a terminal searching section for searching for the terminal apparatus connected to the local network, a terminal information transmitting section for transmitting the information relating to the terminal apparatus searched by the terminal searching section to the client terminal with reference to the information relating to the client terminal stored in the resource server, a driver memorizing section for memorizing a driver program for operating the terminal apparatus, a driver requesting section for requesting a data server connected to an external internet different from the local network for such a type of driver program as requested by request information from the client terminal connected to the local network, a version judgment section for making a judgment as to a version of the driver program transmitted from the data server, a version transmitting section for transmitting information relating to a new version to the client terminal in the case where the judgment by the version judgment section results that the version of the driver program is newer than that of the driver program in a type requested by the request information, a memory judgment section for making a judgment as to whether the driver memorizing section memorizes the driver program requested by the request information, in accordance with the request information transmitted from the client terminal, an installer adding section for adding the driver program to the installer by reading the driver program requested by the request information out of the driver memorizing section in the case where the memory judgment section makes a judgment that the driver memorizing section memorizes the driver program requested by the request information, and an installer transmitting section for transmitting the installer added with the driver program by the installer adding section to the client terminal, and in which the client terminal includes a request information transmitting section for transmitting the request information for requesting the driver program corresponding to the terminal apparatus to the management server in accordance with the information relating to the terminal apparatus transmitted from the management server, and an installing section for installing the driver program transmitted from the management server upon execution of the installer for the driver program.

According to another aspect of the invention, the management server makes a judgment according to the request information from the client terminal, as to whether the driver memorizing section memorizes the driver program. In the case where the driver memorizing section memorizes the driver program, the management server produces the installer with addition of the driver program to transmit this installer to the client terminal, thereby not requiring a process for receiving the driver program through the external network after transmission of the request information, so that the driver program can be distributed more effectively. Furthermore, in the case of receiving a new version of the driver program through the external network, the management server transmits information on this version to the client terminal, so that the client can request a new driver program with reference to the information on the version.

As described above, the terminal management system according to an aspect of the invention has an advantageous effect such that even where a new terminal apparatus is installed on the network, the driver program for the terminal apparatus can be effectively distributed to the client terminal.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 8 is a view illustrating a list of driver programs corresponding to a printer 300;

FIG. 9 is a view illustrating a list of terminal apparatuses connected to a local network;

FIG. 10 is a view illustrating a list of users of the terminal management system;

FIG. 11 is a view illustrating a list of various types of OSes;

FIG. 14 is a view illustrating tree data of a directory service;

FIG. 15 is a view illustrating a structure of a management server 100 according to the second embodiment;

DESCRIPTION OF PREFERRED EMBODIMENTS

First Embodiment

Figure 1:
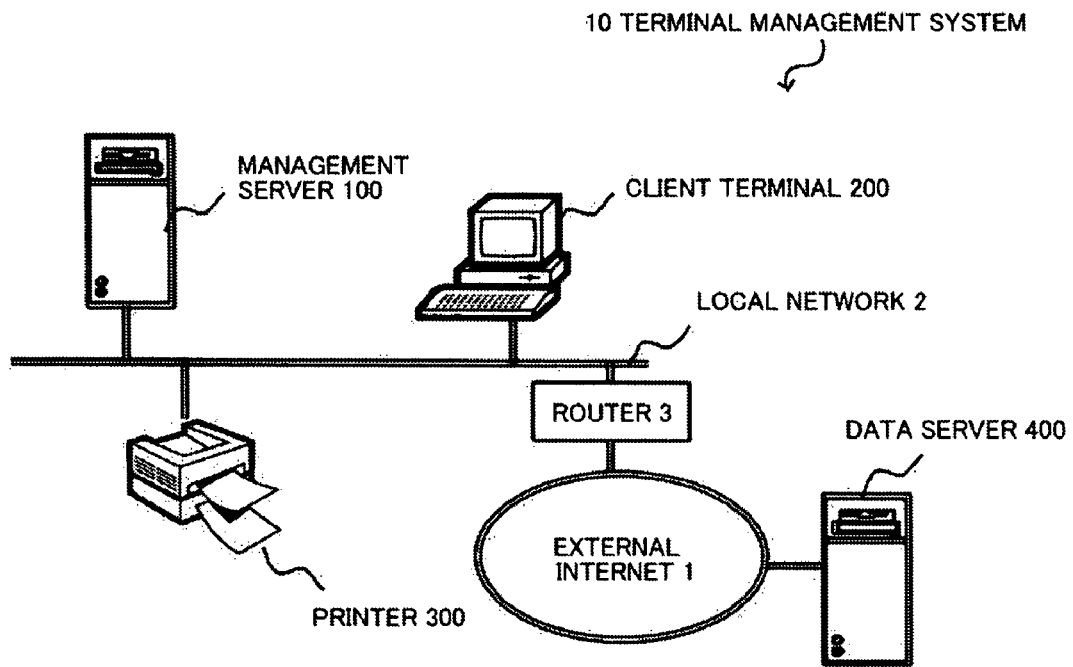
FIG. 1 is a view illustrating a structure of an entire terminal management system according to the invention.

A first embodiment of this invention is described in detail hereinafter with reference to drawings. FIG. 1 is a view illustrating a structure of an entire terminal management system 10 according to the invention. The terminal management system 10 according to the invention includes a data server 400 connected to an external internet 1, a management server 100 connected to a local network 2, a client terminal 200, a printer 300, a router 3 for connecting the external internet 1 to the local network 2.

The external internet 1 is defined as an external network such as the internet as a public network. The local network 2 is defined as a LAN or the like, which allows information transmission and reception between apparatuses such as the management server 100, the client terminal 200, and the like connected to the local area network 2.

The router 3 has function of assigning an IP address for identifying an address of an apparatus such as the management server 100 or the like connected to the local network 2, and enables the information transmission and reception between the apparatuses connected to the local network 2 and the apparatuses connected to the external internet 1.

Figure 3:
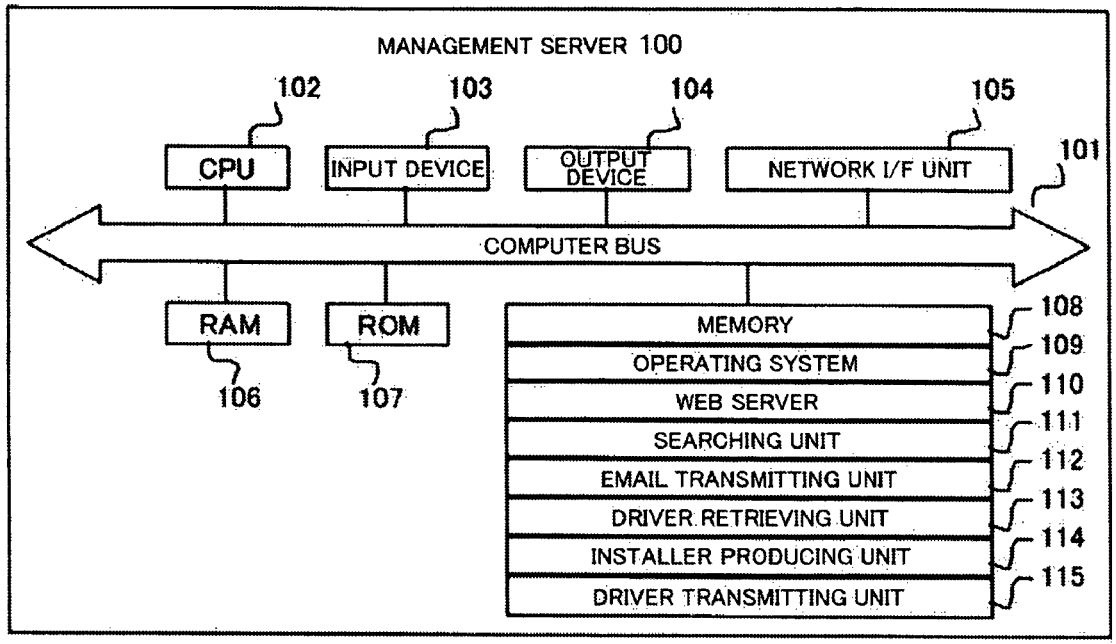
FIG. 3 is a view illustrating a structure of a management server under the terminal management system according to the invention.

FIG. 3 is a view illustrating a structure of the management server 100. The management server 100 includes a computer bus 101 capable of transmitting and receiving information, a CPU 102 capable of carrying out various functions upon execution of programs as described later, an input device 103 composed of a keyboard, a mouse, and the like, an output device 104 composed of a liquid crystal display, a CRT (Cathode-ray tube), and the like, a network I/F unit 105 for conducting the information transmission and reception with other apparatuses through the local network 2, a RAM 106 allowing the information to be stored therein and to be read therefrom, a ROM 107 allowing the information to be read therefrom, and a memory 108 memorizing the program for carrying out the various functions.

The memory 108 memorizes the programs functioning upon execution by the CPU 102. The memory 108 memorizes an operating system 109 as a program for constructing a system allowing the operator or the like to operate the management server 100, a web server 110 as a program operated under the operating system 109, a searching unit 111 as a program having function of searching for the new terminal apparatus connected to the local network 2, an email transmitting unit 112 as a program having function of transmitting an email to the client terminal 200 or the like connected to the local network 2, a driver retrieving unit 113 as a program having function of retrieving the driver program for the terminal apparatus from the data server 400 through the external internet 1, an installer producing unit 114 as a program having function of producing an installer in a manner that the client terminal 200 can install the driver program retrieved through the external internet 1, and a driver transmitting unit 115 as a program having function of transmitting to the client terminal 200 the installer for the driver program produced by the installer producing unit 114. In the meantime, the memory 108 is not limited to such a memory as installed to an interior of the management server 100 but may be an external recording medium such as a hard disk, a floppy (a registered trademark) disk, or the like mounted to an exterior.

Figure 2:
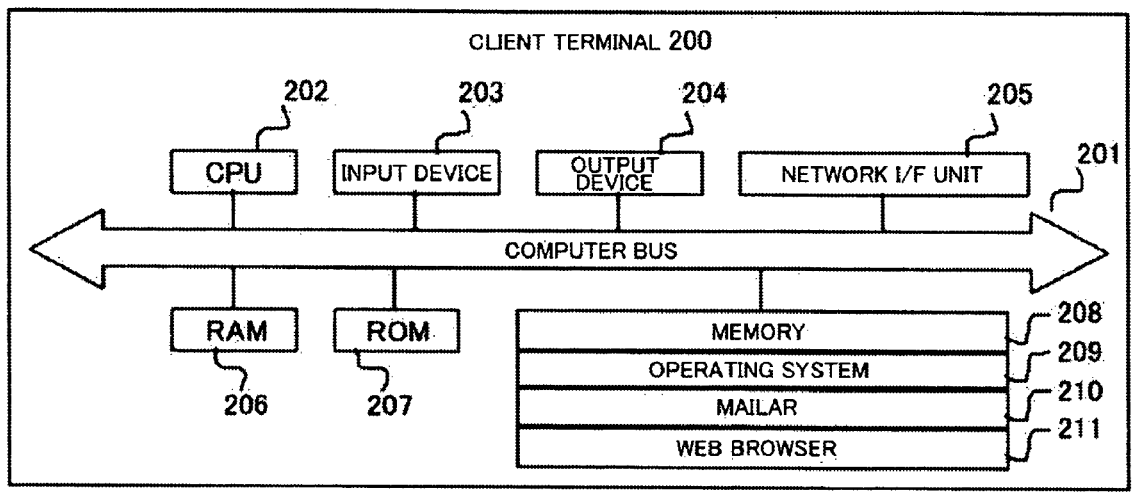
FIG. 2 is a view illustrating a structure of a client terminal under the terminal management system according to the invention.

FIG. 2 is a view illustrating a structure of the client terminal 200. The client terminal 200 includes a computer bus 201 capable of transmitting and receiving the information, a CPU 202 capable of carrying out various functions upon execution of programs as described later, an input device 203 composed of a keyboard, a mouse, and the like, an output device 204 composed of a liquid crystal display, a CRT, and the like, a network I/F unit 205 for conducting the information transmission and reception with other apparatuses through the local network 2, a RAM 206 allowing the information to be stored therein and to be read therefrom, a ROM 207 allowing the information to be read therefrom, and a memory 208 memorizing the program for carrying out the various functions.

The memory 208 memorizes the programs functioning upon execution by the CPU 202. The memory 208 memorizes an operating system 209 as a program for constructing a system allowing a client or the like to operate the client terminal 200, a mailer 210 as a program having function of transmitting emails to the management server 100 connected to the local network, and a web browser 211 as a program having function of downloading the information on the Web page display screen, such as HTML data from the management server 100 through the external internet 1 or the local network 2 to display and output the information to a screen of the output device 204. In the meantime, the memory 208 is not limited to such a memory as installed to an interior of the client terminal 200 but may be an external recording medium such as a hard disk, a floppy (a registered trademark) disk, or the like mounted to the exterior.

The printer 300 is a specific example of the terminal apparatus connected to the local network 2 and is set to make printing operation according to printing-instruction information transmitted under the function of the driver program installed into the client terminal 200. The data server 400 is mounted onto the local network 2 by an administrator working for a maker of the printer 300, the operator, or the like, and memorizes the information or the data which can be read out. The data server 400 includes a driver memorizing unit 401 for memorizing the driver programs corresponding to multiple types of printers 300 compliant with various types of OSes such as "Windows Me", "Windows 2000", "Windows XP", and "Windows NT" (registered trademarks of Microsoft Corporation), OS languages, and emulation such as "PS" (a registered trademark of Adobe Systems Incorporated) and "PCL" (a registered trademark of Hewlett-Packard Company), not shown, and a driver transmitting unit 402 for transmitting the appropriate driver program according to a request for the driver program transmitted through the external internet 1.

Figure 4:
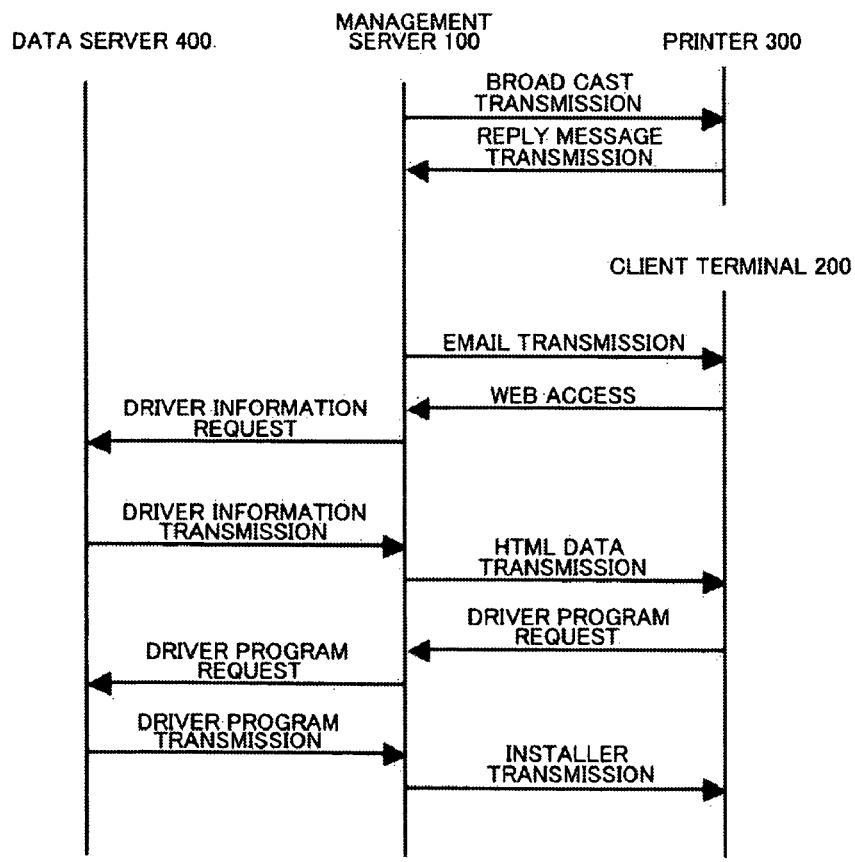
FIG. 4 is a view illustrating operation of an entire terminal management system according to a first embodiment of this invention.

Operation of the terminal management system 10 according to the first embodiment is subsequently described in detail with reference to the drawings. First, a general outline of the operation of the terminal management system 10 is explained in detail with reference to FIG. 4. The management server 100 transmits such the information as requiring the information on the apparatus to all of the apparatuses on the local network 2 by broadcast transmission to detect the new terminal apparatus. Upon reception of transmission of the information on the printer 300 from the printer 300, the management server 100 makes a judgment as to whether the transmitted information is on the new terminal apparatus not yet stored in the memory 108. The management server 100 produces to transmit to the client terminal 200, the email having the status such that the new terminal apparatus is installed.

Where the client terminal 200 gets Web access to request the Web page, the management server 100 makes a request to the data server 400 for the information on the driver program for the printer 300 through the external internet 1. Upon reception of transmission of the information on the driver program from the data server 400, the management server 100 produces to transmit to the client terminal 200, the HTML data for the Web page showing the information on the driver program. Upon a request for the driver program shown in the Web page from the client terminal 200, the management server 100 makes a request to the data server 400 for the driver program through the external internet 1. Upon transmission of the driver program from the data server 400, the management server 100 produces and transmits to the client terminal 200, the installer to install the transmitted driver program.

Subsequently, such a process is described in detail with reference to FIG. 5, that the management server 100 transmits the email about the new terminal apparatus to the client terminal 200. First, the CPU 102 of the management server 100 makes a broadcast transmission process at the step S501. The CPU 102 produces such apparatus request information as requesting the information on the apparatus in order to search for the new terminal apparatus by activating the program for the searching unit 111. The apparatus request information may be previously stored in the memory 108 or the ROM 107. The CPU 102 transmits by the broadcast transmission, the apparatus request information to all of the apparatuses connected to the local network 2. The process at the step S501 is executed at intervals of, e.g., twenty-four hours.

The CPU 102 makes a time-out detecting process at the step S502. The CPU 102 makes a judgment as to whether the predetermined time has past, using a timer or the like, not shown, inside the management server 100. In the case of "YES" at the step S502 in FIG. 5, that is, where the predetermined time has past without a reply to the broadcast transmission, the process is terminated.

Next, in the case of "NO" at the step S502, that is, where the printer 300 transmits the information as a reply to the broadcast transmission within the predetermined time, the CPU 102 receives and stores the information on the printer 300 in the RAM 10 at the step S503. The information on the printer 300 contains a model name, an IP address, a MAC address, and the like of the printer model 300.

The CPU 102 subsequently makes a judgment at the step S504, as to whether the printer 300 is the new terminal apparatus. The CPU 102 reads out such a printer information list stored in the memory 108, as shown in FIG. 9, and searches the printer information list based on the information on the printer 300 stored in the RAM 106. In the case of "NO" at the step S504, that is, where the printer information list contains the information on the printer 300, the processes subsequent to the step S502 are executed repeatedly.

Figure 5:
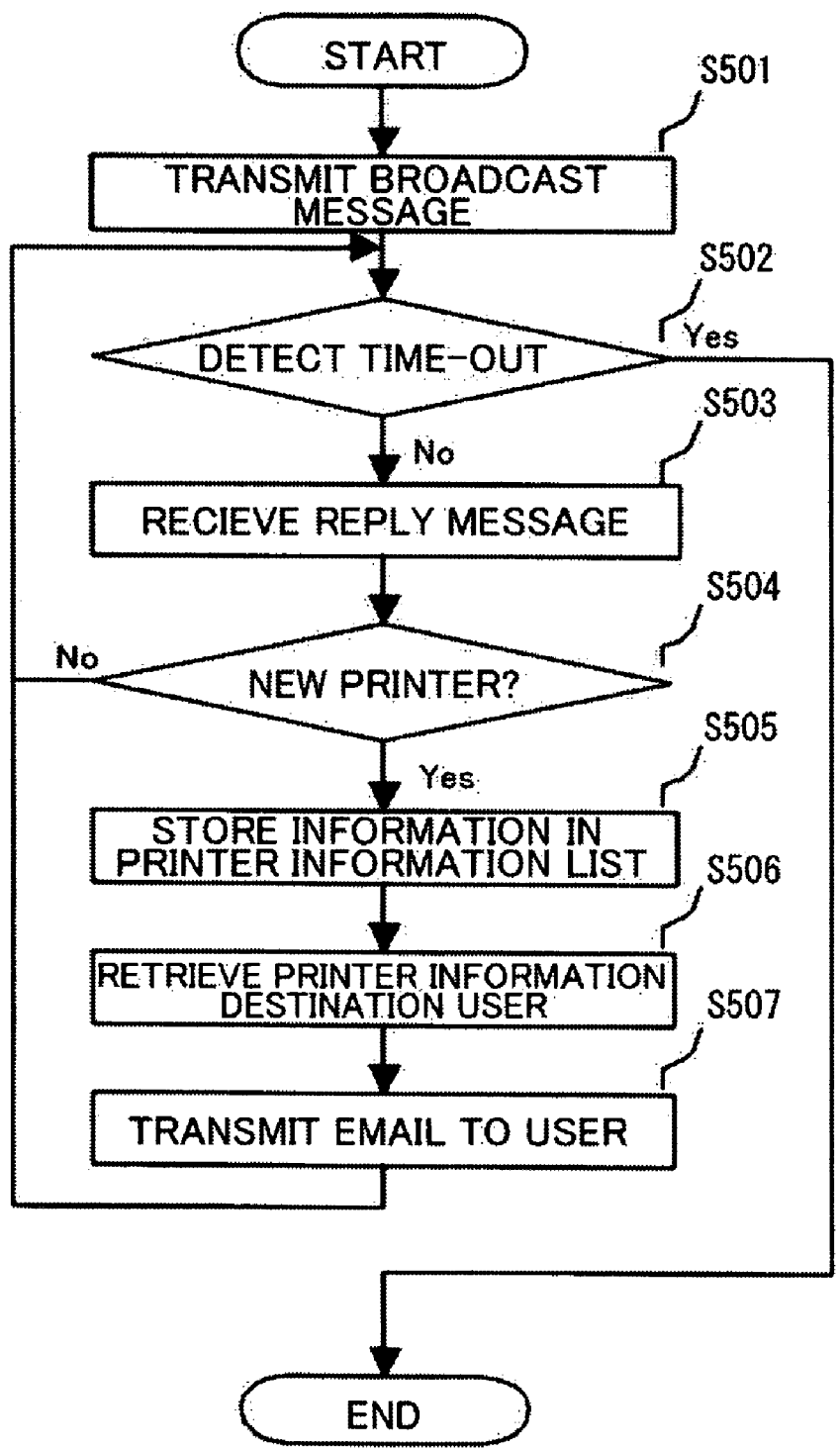
FIG. 5 is a view illustrating operation of a management server under the terminal management system according to the first embodiment of this invention.

Next, in the case of "YES" at the step S504 in FIG. 5, that is, where the printer information list does not contain the information on the printer 300, the CPU 102 judges that the printer 300 is the new terminal apparatus and adds the information on the printer 300 to the printer information list, thereby storing the information in the memory 108. In this case, the information on "Printer C" as the name of the printer 300, for example, is to be added to a network area of group B.

The CPU 102 subsequently makes a process to retrieve the information on the client terminal at the step S506. The CPU 102 reads out the user information list as shown in FIG. 10, stored in the memory 108. The CPU 102 then refers the same network area as that of the printer 300, thereby retrieving an email address of "User 3" corresponding to the client terminal 200 as a user of this network area.

The CPU 102 subsequently makes a process to transmit an email to the client terminal 200 at the step S507. The CPU 102 activates the program for the email transmitting unit 112 to produce the email showing the status that the printer 300 is mounted as the new terminal apparatus and a URL used for getting Web access to the management server 100. The CPU 102 then refers the email address of the "User 3" corresponding to the retrieved client terminal 200 to transmit the email using the network I/F unit 105. The CPU 102 is thereafter set in a standby mode until reception of other replies to the broadcast transmission executed at the step S501, and the processes subsequent to the step S502 are executed repeatedly.

Figure 6:
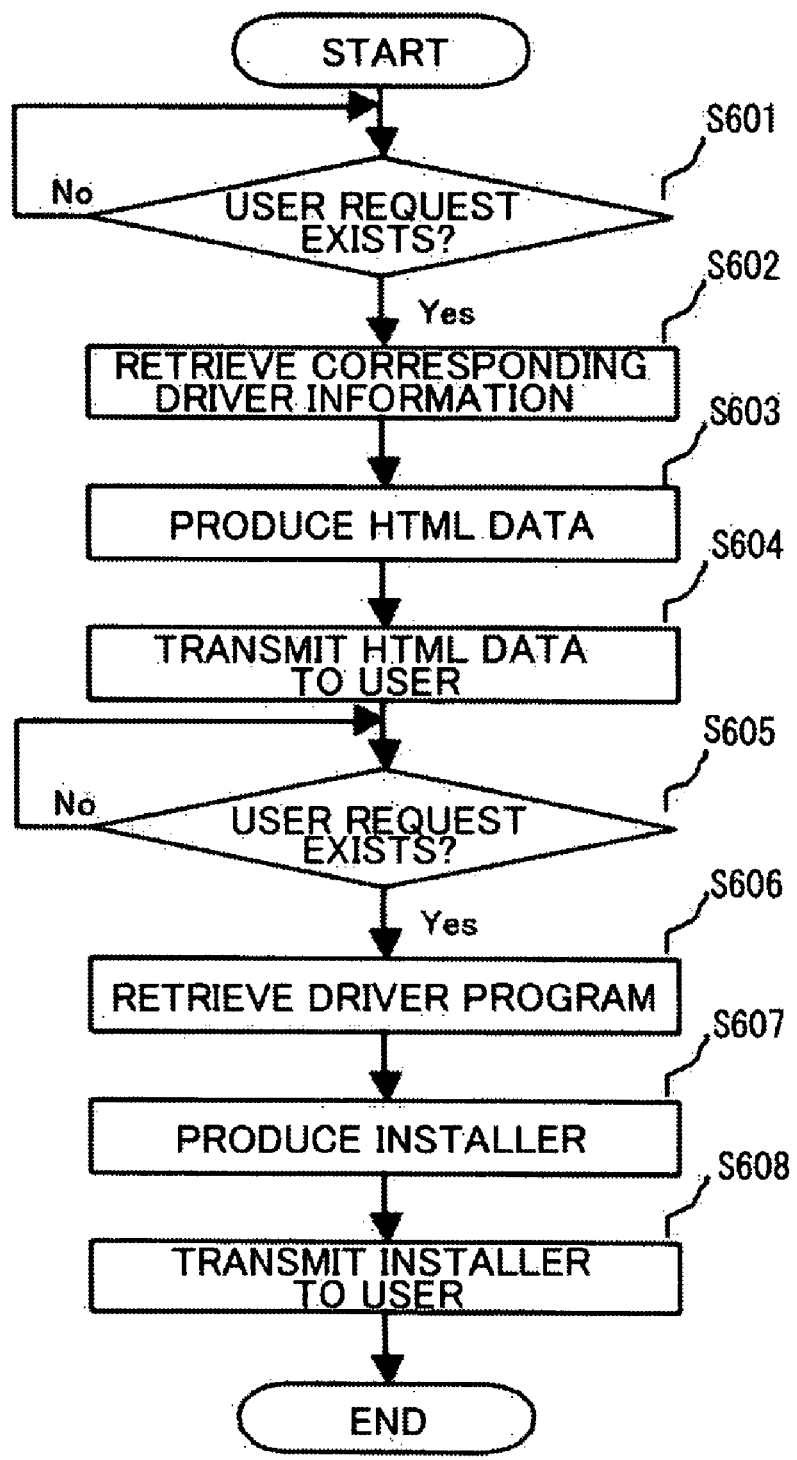
FIG. 6 is a view illustrating operation of the management server under the terminal management system according to the first embodiment of this invention.

Subsequently, such a process is described in detail with reference to FIG. 6, that the management server 100 transmits the installer for the driver program to the client terminal 200. First, the CPU 102 of the management server 100 makes a judgment at the step S601 as to whether there is a request for the Web page. The CPU 102 makes a judgment as to whether the client terminal 200 gets Web access to the management server 100 to request for the Web page. In the case of "NO" at the step S601 in FIG. 6, that is, where there is not any request for the Web page, this process is executed repeatedly.

Next, in the case of "YES" at the step S601, that is, where there is a request for the Web page, the CPU 102 makes a process at the step S602 to retrieve the information on the driver program corresponding to the printer 300, to be shown in the requested Web page. The CPU 102 transmits to the data sever 400 the driver request information requesting the information on the driver program corresponding to the printer 300, using the network I/F unit 105.

Upon reception of the driver request information through the external internet 1, the data server 400 searches the driver memorizing unit 401 based on the driver request information to read out the list data showing the driver program corresponding to the printer 300, as shown in FIG. 8. The list data shows a modem name of the printer 300, a name of each driver program corresponding to the printer 300, and an OS, emulation, a language of the OS, and a version supported by each driver program. The data server 400 transmits the list data to the management server 100 through the external internet 1. Upon reception of the list data, the management server 100 stores the list data in the RAM 106.

Figure 12:
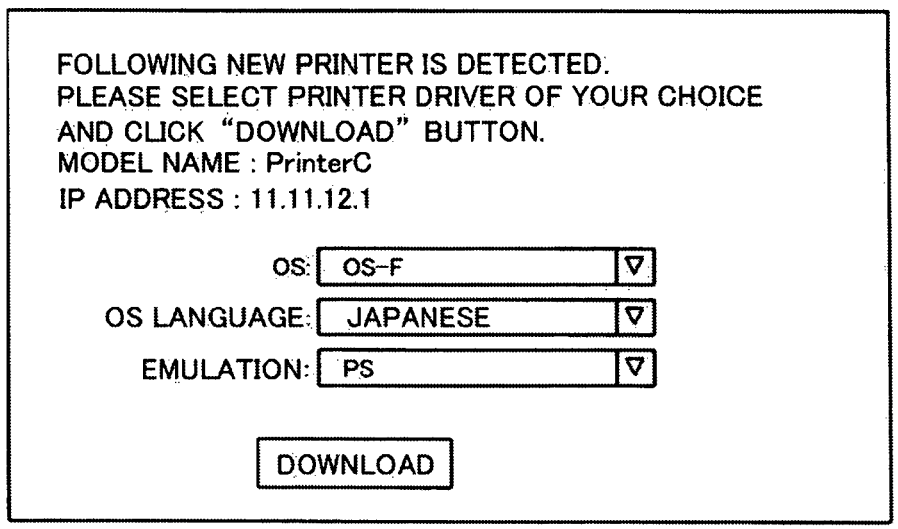
FIG. 12 is a view illustrating an email informing a status that the new terminal apparatus is installed.

Next, the CPU 102 makes a process to produce the HTML data for the Web page at the step S603. The CPU 102 activates the web server 110 to produce the HTML data for the Web page for selecting the driver program as shown in FIG. 12, based on the list of driver programs corresponding to the printers 300 and further, adds the IP address and the MAC address of the printer 300 to the HTML data. The Web page shown in FIG. 12 shows a name, an IP address, a MAC address, or the like of the printer 300, in which the information on a type of driver program is to be selected using a pull-down menu The CPU 102 subsequently makes a process to transmit the HTML data for the Web page at the step S604. The CPU 102 transmits using the network I/F unit 105 the produced HTML data to the client terminal 200 which got the Web access to the management server 100.

The CPU 102 makes a judgment at the step S605 as to whether the client terminal 200 requests the driver program. The CPU 102 makes a judgment as to whether to the client terminal 200 transmits a program request information for requesting any one type of driver program by selecting or designating an OS, emulation, a language of the OS, or the like supported by the driver program, using the pull-down menu in the Web page of the HTML data transmitted at the step S604. In the case of "NO" at the step S605 in FIG. 6, that is, where there is not any request for the driver program, this process is executed repeatedly.

In the case of "YES" at the step S605, the CPU 102 makes a process to retrieve the requested type of driver program at the step S606. The CPU 102 transmits to the data server 400 using the network I/F unit 105, the program retrieving information for requesting retrieval of such the type of driver program as requested by the program request information transmitted from the client terminal 200.

Upon reception of the program retrieving information through the external internet 1, the data server 400 searches the driver memorizing unit 401 based on the program retrieving information to read out the requested type of driver program. The program retrieving information contains the information on the OS, emulation, the OS language, or the like designated by the program request information, supported by the driver program. The data server 400 searches the driver memorizing unit 401 for the driver program corresponding to the above information, thereby reading out the corresponding driving program. The data server 400 transmits using the driver transmitting unit 402, the read-out driver program through the external internet 1 to the management server 100. The management server 100 receives and stores this driver program in the RAM 106.

Next, the CPU 102 subsequently makes a process to produce the installer for the driver program at the step S607. The CPU 102 activates the installer producing unit 114 to read out such the program for the installer, as executing installation of the program previously stored in the memory 108, thereby adding the driver program stored in the RAM 106 to this installer.

The CPU 102 subsequently makes a process to transmit the installer to the client terminal 200 at the step S608. The CPU 102 activates the driver transmitting unit 115 to transmit using the network I/F unit 105, the installer added with the driver program to the client terminal 200 which got Web access to the management server 100.

Figure 7:
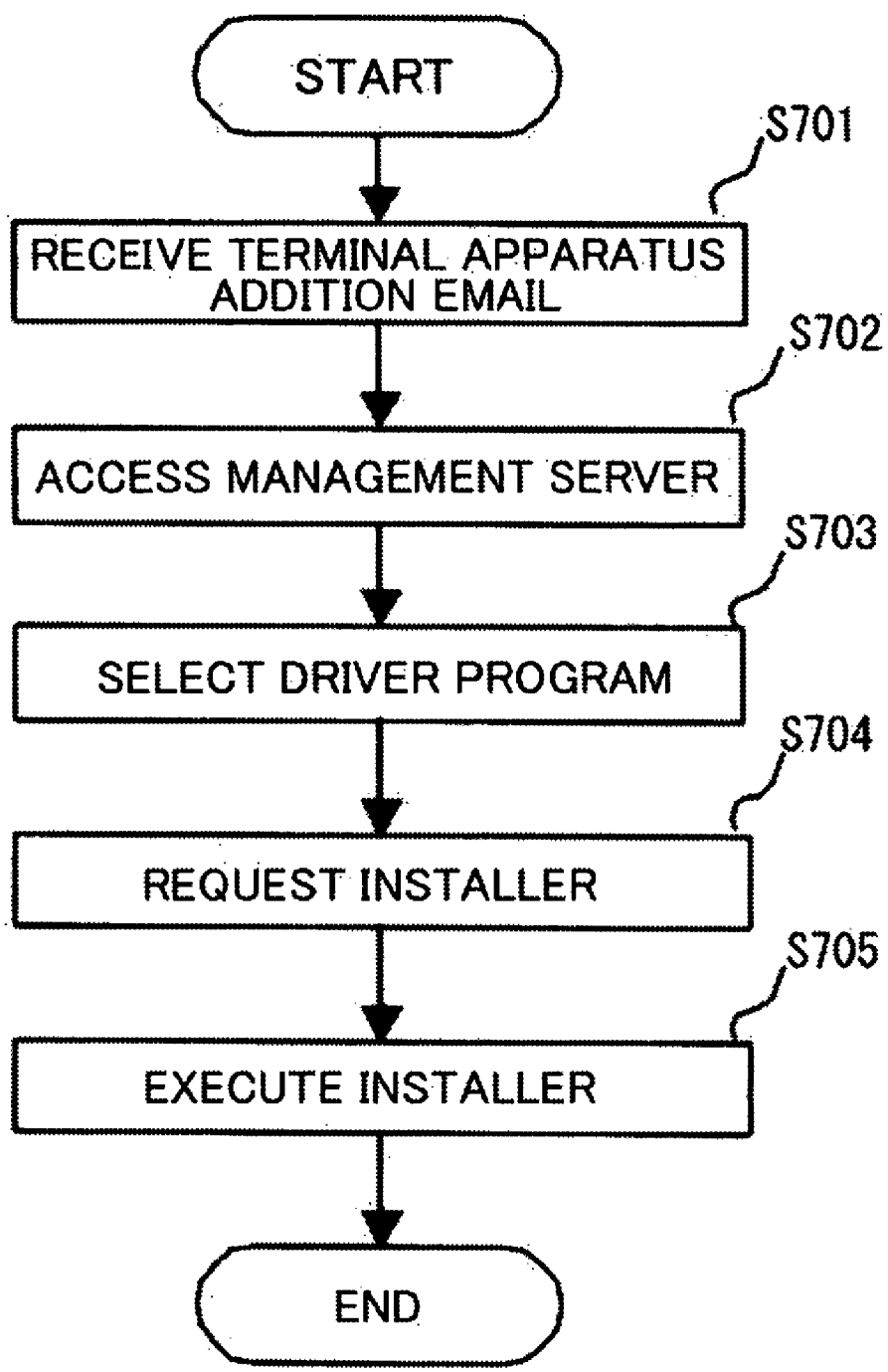
FIG. 7 is a view illustrating operation of a client terminal under the terminal management system according to the first embodiment of the invention.

Subsequently, such a process is described in detail with reference to FIG. 7, that the client terminal 200 executes installation using the installer for the driver program. First, the CPU 202 of the client terminal 200 displays and outputs the email to the output device 204 in the case of receiving at the step S701 the email transmitted from the management server 100 at the aforementioned step S507. At the sight of this email displayed and output as described above, the user confirms that the printer 300 is installed as the new terminal apparatus.

The CPU 202 then gets Web access to the management server 100 at the step S702 according to the user's operation using the input device 203. Where the user judges installation of the driver program for the printer 300 as necessary upon confirmation of the installation of the printer 300 and inputs using the input device 203 a URL used for getting Web access to the management server 100, the CPU 202 activates the web browser 211 to get Web access for requesting the Web page to the management server 100 identified by the URL.

The CPU 202 subsequently makes a process to select the driver program at the step S703, according to the user's operation on the Web page using the input device 203. The CPU 202 displays and outputs the Web page of the HTML data shown in FIG. 12 to the output device 204 upon transmission of the HTML data from the management server 100, according to request for the Web page on the Web access at the step S604, The user then selects an OS, a language of the OS, emulation, and the like of the client terminal 200 using the pull-down menu displayed on the Web page. The CPU 202 selects such the type of driver program as identified by each of parameters such as the OS, the language of the OS, the emulation of the like, selected as described above, thereby producing the program request information for requesting the management server 100.

The CPU 202 then transmits the program request information produced as described above to the management server 100 using the network I/F unit 205 at the step S704.

The CPU 202 subsequently executes installation at the step S705 where the installer added with the driver program is transmitted according to the transmission of the program request information. The CPU 202 executes the installer upon transmission of the installer, to install the driver program added to the installer. This installation of the driver program enables the user to activate the driver program by means of the client terminal 200, thereby being able to operate the printer 300.

As described above, the CPU 102 detects the new terminal apparatus and transmits, in the case of request for the driver program from the client terminal 200, the program retrieving information requesting for the requested type of the driver program to the data server 400, thereby searching and reading out of the driver memorizing unit 401 of the data server 400 to retrieve the aforementioned driver program. The CPU 102 then transmits the installer added with the driver program to the client terminal 200 to execute installation.

Therefore, the client terminal 200 can install the appropriate driver program without requiring the operator or the like operating the management server 100 to make operation to previously acquires each driver program corresponding to the printer 300 to store and set each driver program in a downloadable state in the management server 100, so that such the terminal management system can be realized that the appropriate driver program can be installed easily, and the convenience can be improved. Yet further, stability and high reliability can be realized by reducing the load on the memory 108. Furthermore, it becomes possible that the management server 100 retrieves the driver program from the data server 400 and transmits this driver program to the client terminal 200 to effectively distribute the driver program.

Second Embodiment

Figure 13:
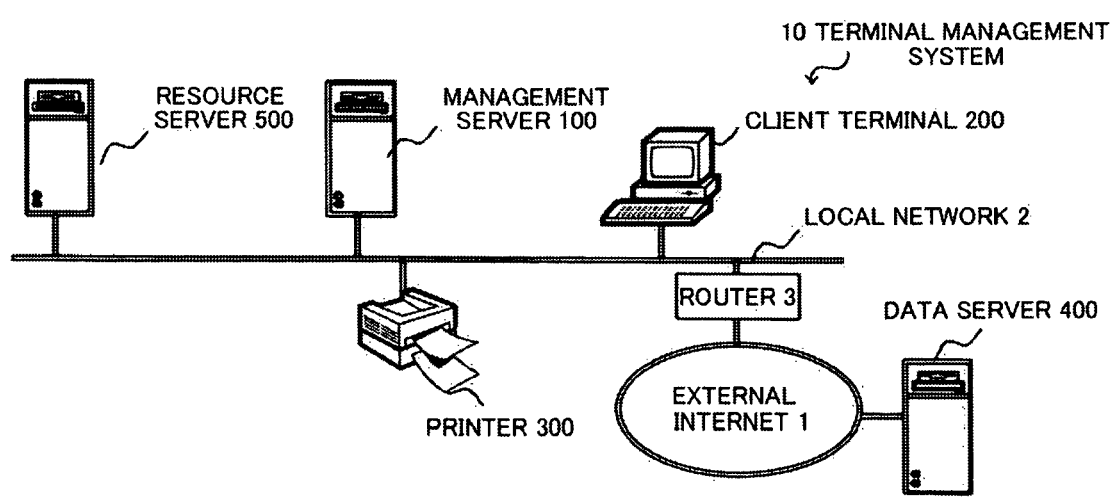
FIG. 13 is a view illustrating a structure of an entire terminal management system according to a second embodiment of the invention.

A second embodiment of this invention is described in detail hereinafter with reference to drawings. FIG. 13 is a view illustrating a structure of the entire terminal management system 10 according to the second embodiment of the invention. The terminal management system 10 according to the second embodiment includes a resource server 500 connected to the local network 2, in addition to structure of the management terminal system 10 according to the first embodiment.

FIG. 15 is a view illustrating a structure of the management server 100 according to the second embodiment. With respect to the management server 100 according to the second embodiment, the memory 108 stores a directory service access unit 116 defined as a program having function of getting access to the tree data of a directory service as described later to update contents of the tree data. The other aspects of the structure are substantially the same as those of the first embodiment, so that the explanation for those is omitted.

As shown in FIG. 14, the resource server 500 includes a tree data memorizing unit 501 storing tree data of the directory service displaying in a tree structure information on the local network 2 such as each network area, information on the printer such as a name, an IP address, a MAC address, and the like, information on the user such as a name and the like, and information on the client terminal. It is to be noted that the other aspects of the structure of the terminal management system 10 are substantially the same as those of the first embodiment, so that the explanation for those is omitted.

Figure 16:
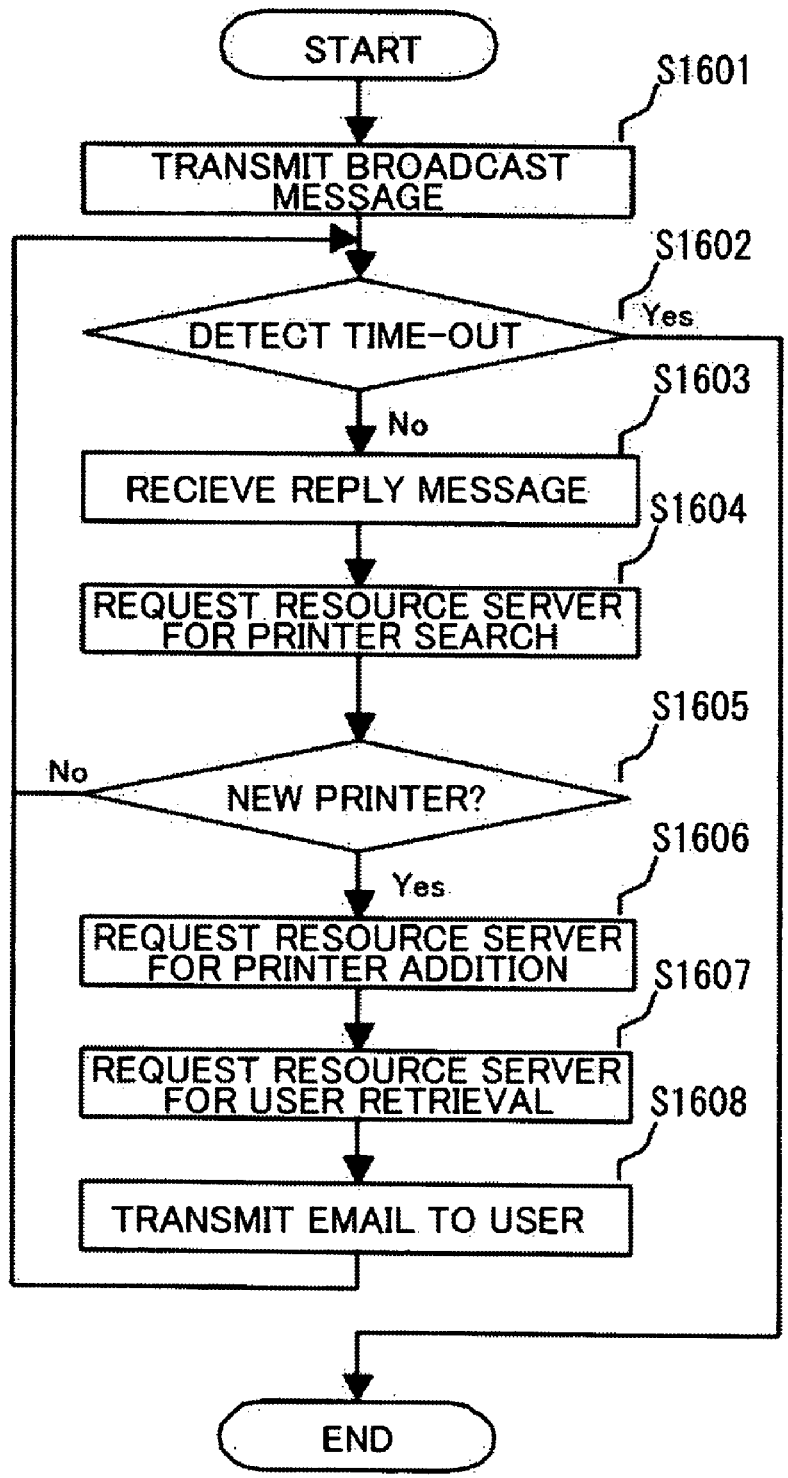
FIG. 16 is a flow chart showing operation of the management server 100 according to the second embodiment.

Next, operation of the terminal management system 10 according to the second embodiment is described with reference to drawings. The terminal management system 10 according to the second embodiment is substantially the same as that of the first embodiment in operation except a process for transmitting an email about the new terminal apparatus to the client terminal 200, so that this process is described in detail with reference to a flow chart shown in FIG. 16. The CPU 102 of the management server 100 executes a broad cast transmission process at the step S1601. The CPU 102 activates a program of the searching unit 111 and produces the apparatus request information for requesting information on the apparatus in order to detect the new terminal apparatus. The apparatus request information may be stored in advance in the memory 108 or the ROM 107. The CPU 102 transmits by the broadcast transmission, the apparatus request information to all of the apparatuses connected to the local network 2. The process at the step S1601 is executed at intervals of, e.g., twenty-four hours.

The CPU 102 makes a time-out detecting process at the step S1602. The CPU 102 makes a judgment as to whether the predetermined time has past using a timer or the like, not shown, inside the management server 100. In the case of "YES" at the step S1602 in FIG. 16, that is, where the predetermined time has past without a reply to the broadcast transmission, the process is terminated.

Next, in the case of "NO" at the step S1602, that is, where the printer 300 transmits the information as a reply to the broadcast transmission within the predetermined time, the CPU 102 receives and stores the information on the printer 300 in the RAM 106 at the step S1603. The information on the printer 300 contains a model name, an IP address, a MAC address, and the like of the printer model 300.

The CPU 102 subsequently makes a process to request the resource server 500 to search for the printer 300 at the step S1604. The CPU 102 activates the program for the directory service access unit 116 to transmit the search request information for requesting search of the information on the printer 300 to the resource server 500.

The CPU 102 then makes a judgment at the step S1605 as to whether the printer 300 is the new terminal apparatus. The CPU 102 transmits the information on the printer 300 stored in the RAM 106 to the resource server 500. A CPU, not shown, of the resource server 500 refers to the tree data stored in the tree data memorizing unit 501 and makes a process to search the tree data based on the information on the printer 300. In the case of "NO" at the step S1605 in FIG. 16, that is, where the tree data contain the information on the printer 300, the processes subsequent to the step S1602 are executed repeatedly.

Next, in the case of "YES" at the step S1605, that is, where the tree data do not contain the information on the printer 300, the resource server 500 transmits to the management server 100 the information having the status such that the tree data do not contain the information on the printer 300. The CPU 102 makes a process to request for addition of the information on the printer 300 at the step S1606. The CPU 102 judges that the printer 300 is the new terminal apparatus in the case of reception of the information such that the tree data do not contain the information on the printer 300, thereby transmitting to the resource server 500 addition request information for adding the information on the printer 300 to the tree data. Upon reception of the addition request information, the resource server 500 then adds the information on the printer 300 to the tree data and stores the data in the tree data memorizing unit 501. Herein, the information on "Printer C" as the name of the printer 300, for example, is to be added to a network area.

The CPU 102 subsequently makes a process to request the resource server 500 for the information on the client terminal at the step S1607. The CPU 102 transmits to the resource server 500 client request information for requesting the information on the client terminal connected to an interior of the network area containing the printer 300. Upon reception of the client request information, the resource server 500 reads out the tree data stored in the tree data memorizing unit 501. The resource server 500 refers to the same network area as that of the printer 300 in the tree data to read out the email address of the user in the network area to transmit the email address to the management server 100. In this case, the resource server 500 retrieves the email address of "User 3" corresponding to the user using the client terminal 200 in the network area of group B same as that of the printer 300.

The CPU 102 subsequently makes a process to transmit the email to the client terminal 200 at the step S1608. The CPU 102 activates the program for the email transmitting unit 112 to produce the email having the status such that the printer 300 is installed as the new terminal apparatus, displaying a URL used for getting Web access to the management server 100. The CPU 102 refers to the email address of the "User 3" corresponding to the client terminal 200 transmitted from the resource server 500 and transmits the email using the network I/F unit 105. The CPU 102 is thereafter set in a standby mode until reception of other replies to the broadcast transmission executed at the step S1601, and the processes subsequent to the step S1602 are executed repeatedly.

As described above, upon reception of the information on the printer 300, the CPU 102 searches the tree data stored in the resource server 500 and adds this information to the tree data in the case where the tree data do not contain this information as the result of searching and the printer 300 was found to be the new terminal apparatus. The CPU 102 then retrieves the email address of the user using the client terminal 200 from the tree data, thereby transmitting to the client terminal 200 the email informing that the printer 300 is installed.

Thus, the email informing that the new terminal apparatus is installed can be transmitted to the client terminal 200 without requiring the operator and the like operating the management server 100 to previously acquire the information on the network area inside the local network 2, the information on the apparatus, and the like and to store the information in the memory 108 of the management server 100, thereby being able to realize easy transmission of the email informing installation of the new terminal apparatus. Furthermore, it is not necessary to store the tree data in the memory 108 of the management server 100, so that maintenance operation for the management server 100 can be reduced to reduce the load on the memory 108, thereby being able to realize stability and high reliability of the memory 108.

Third Embodiment

A third embodiment of this invention is described in detail hereinafter with reference to drawings. The terminal management system 10 according to the second embodiment and that of the third embodiment are substantially the same in a structure except a structure of the management server 100.

Figures 17, 18:
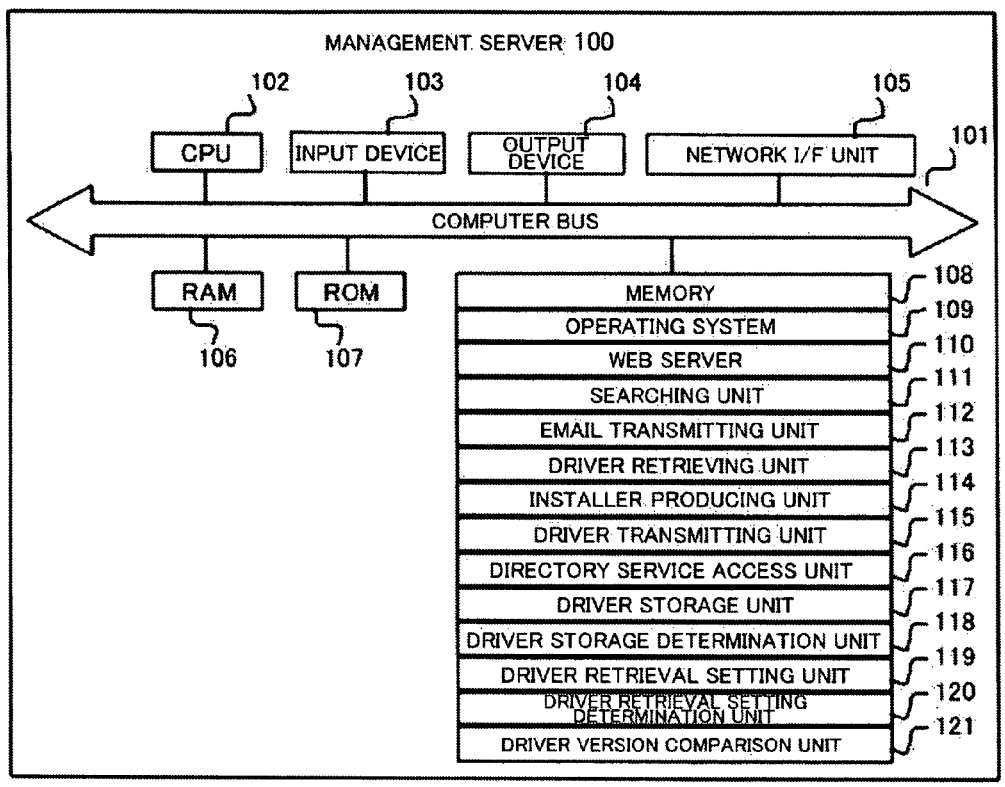
FIG. 17 is a view illustrating a structure of a management server according to a third embodiment.
FIG. 18 is a view illustrating a list of driver programs according the third embodiment.

FIG. 17 is a view illustrating a structure of the management server 100. The memory 108 of the management server 100 according to the third embodiment further stores a driver storage unit 117 for previously storing the driver programs corresponding to the plurality types of printers 300 in accordance with various types of OSes, OS languages, and emulation, a driver storage determination unit 118 defined as a program having function of searching the driver storage unit 117 based on the program request information transmitted from the client terminal 200, a driver retrieval setting unit 119 defined as a program having function of making a setting for retrieving from the data server 400 the same type of the driver program as that of the driver program stored in the driver storage unit 117, a driver retrieval setting determination unit 120 defined as a program having function of determining contents set by the driver retrieval setting unit 119, and a driver version comparison unit 121 defined as a program having function of making a comparison among version information for the plurality of the same types of driver programs.

Operation of the terminal management system according to the third embodiment is described next with reference to drawings. The terminal management system 10 according to the third embodiment and that of the second embodiment are substantially the same in operation except processes subsequent to the step S605 in a process such that the management server 100 transmits the installer for the driver program to the client terminal 200, so that those processes will be described in detail with reference to the flow chart shown in FIG. 19. The CPU 102 of the management server 100 makes a judgment at the step S1901 as to whether the client terminal 200 requests the driver program. The CPU 102 makes a judgment as to transmission of the program request information requesting for any one type of the driver programs upon selection or designation of the OS, emulation, the OS language, and the like supported by the driver program in the pull-down mane in the Web page of the HTML data transmitted from the client terminal 200 at the aforementioned step S604. In the case of "NO" at the step S1901 in FIG. 19, that is, where there is not any requests for the driver program, this process is executed repeatedly.

Next, in the case of "YES" at the step S1901, that is, where there is a request for the driver program, the CPU 102 makes a process at the step S1902 to judge as to whether a requested type of driver program is stored. The CPU 102 activates the driver storage determination unit 118 to search the driver program stored in the driver storage unit 117. The CPU 102 refers to the driver program list stored in the memory 108, as shown in FIG. 18, and searches such a type of driver program as corresponding to information such as the OS, emulation, the OS language, and the like supported by the driver program designated by the program request information. As the result of searching, in the case of "NO" at the step S1902 in FIG. 19, that is, where such a type of driver program as requested by the program request information is not stored in the driver storage unit 117, the processes subsequent to the step S1907 to the step S1912 are executed repeatedly but the processes subsequent to the step S1904 are not executed.

Next, in the case of "YES" at the step S1902, where such a type of driver program as requested by the program request information is stored in the driver storage unit 117, the CPU 102 makes a judgment at the step S1903 as to whether such a type of driver program as requested by the program request information is to be retrieved. The CPU 102 activates the program for the driver retrieval setting unit 119, and makes a judgment such that the requested type of driver program is to be retrieved from the data server 400 in the case where the predetermined conditions are satisfied. The judgment is made that the requested type of driver program is to be retrieved from the data server 400 on the condition that the requested type of driver program was stored in the driver storage unit 117 more than one year ago, as the predetermined conditions. In the case of "NO" at the step S1903 in FIG. 19, that is, where the judgment is made that the requested type of driver program is not retrieved from the data server 400, the processes subsequent to the step S1904 are executed. In the case of "YES" at the step S1903 in FIG. 19, that is, where the judgment is made that the requested type of driver program is to be retrieved from the data server 400, the CPU 102 refers to the data for retrieval setting for the driver program stored in the memory 108, as shown in FIG. 20, thereby setting a setting item in the data to "retrieval". The CPU 102 then updates an item of a driver reception flag for the requested type of driver program to "1" among contents of the driver program list as shown in FIG. 18, thereby storing the updated contents into the memory 108.

Figure 19:
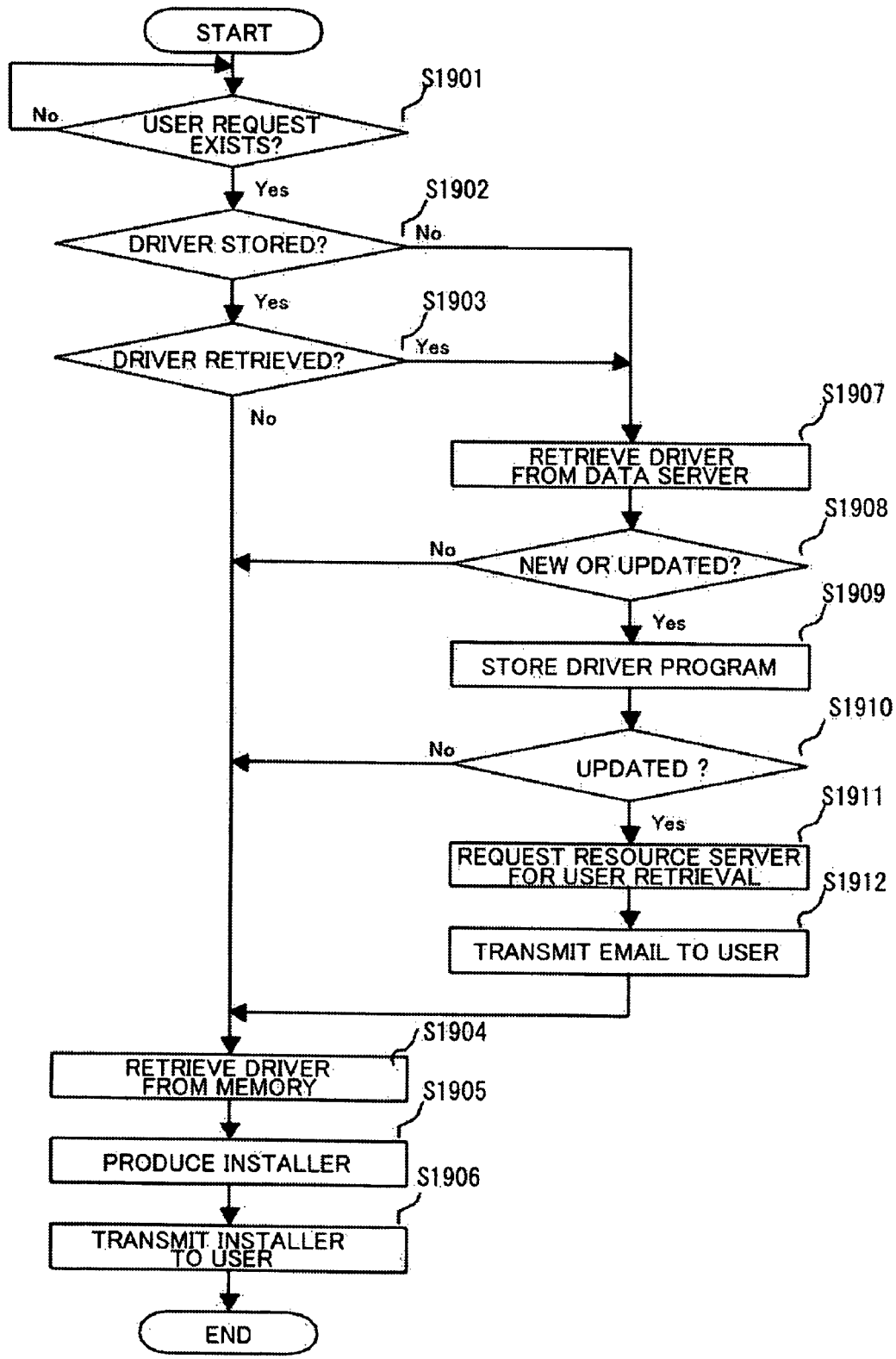
FIG. 19 is a flow chart showing operation of the management server according the third embodiment.
Figures 20, 21:
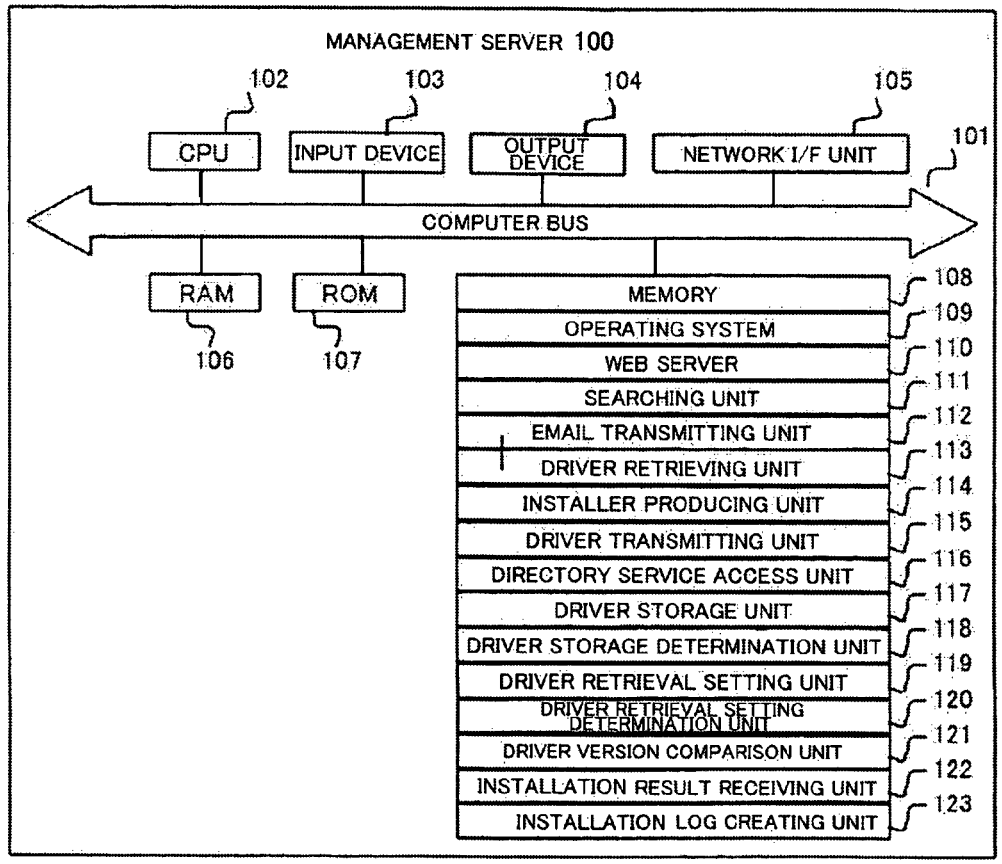
FIG. 20 is a view illustrating data used for acquisition setting of the driver program according to the third embodiment.
FIG. 21 is view illustrating a structure of a management server according to fourth embodiment.

Next, in the case of "YES" at the step S1903 in FIG. 19, that is, where the judgment is made that the requested type of driver program is to be retrieved from the data server 400, the CPU 102 makes a process to retrieve the requested type of driver program at the step S1907. The CPU102 transmits to the data server 400 the program retrieval information requesting retrieval of such the type of driver program as requested by the program request information, using the network I/F unit 105.

Upon reception of the program retrieval information through the external internet 1, the data server 400 searches the driver memorizing unit 401 based on the program retrieval information to read out the requested type of driver program. The program retrieval information contains information on the OS, emulation, the OS language, and the like designated by the program request information, supported by the driver program, and searches to read out the driver program corresponding to the aforementioned information. The read-out driver program is transmitted through the external network 1 to the management server 100 by the driver transmitting unit 402. The management server receives and stores the driver program in the RAM 106.

Next, the CPU 102 makes a process at the step S1908 to make a judgment as to whether the version information of the retrieved driver program is new. The CPU 102 activates the program for the driver version comparison unit 121 to read the same type of driver program as that of driver program which was retrieved as described above, out of the driver storage unit 117, thereby comparing the version information added to this driver program with the version information added to the driver program stored in the RAM 106. As the result of comparison, in the case of "NO" at the step S1908 in FIG. 19, that is, where the version information of the driver program stored in the RAM 106 is neither newer type nor updated compared with the driver program stored in the driver storage unit 117, the processes subsequent to the step S1904 are executed. Herein, in the case where such the type of drive program as requested by the program request information is not stored in the driver storage unit 117 at the step S1902, those processes are not executed but the process at the step S1909 is executed.

Next, in the case of "YES" at the step S1908, that is, where the version information of the driver program stored in the RAM 106 is newer type or updated compared with the driver program stored in the driver storage unit 117, the CPU 102 makes a storing process at the step S1909. The CPU 102 stores in the RAM 106 the driver program stored in the driver storage unit 117 of the memory 108 and adds contents of the driver program to the driver program list stored in the memory 108, thereby storing the contents in the memory 108.

Next, the CPU 102 makes a judgment at the step S1910 as to whether the comparison result at the step S1908 is that the version information is updated. In the case of "NO" at the step S1910, that is, where the comparison result is that the version information is a new type, the processes subsequent to the step S104 are executed.

Next, in the case of "YES" at the step S1910, that is, where the comparison result at the step S1908 is that the version information is updated, the CPU 102 makes a process to request the resource server 500 for the information on the client terminal 200 at the step S1911. The CPU 102 transmits to the resource server 500 the client request information requesting the information on the client terminal 200 as a request source of the program request information. Upon reception of the client request information, the resource server 500 reads out the tree data stored in the tree data memorizing unit 501. The resource server 500 reads the email address of the user as a request source of the program request information out of the tree data to transmit the email address to the management server 100. Retrieved herein is the email address of the "User 3" corresponding to the user using the client terminal 200, for example.

Next, the CPU 102 makes a process to transmit the email to the client terminal 200 at the step S1912. The CPU 102 activates the program for the email transmitting unit 112 to produce the email informing that such the type of driver program as requested by the program request information is updated. The CPU 102 then refers to the email address of the "User 3" corresponding to the client terminal 200, transmitted from the resource server 500, thereby transmitting the email using the network I/F unit 105.

Next, the CPU 102 reads the driver program requested by the program request information out of the memory 108 to make a process for storing the driver program in the RAM 106 at the step S1904.

The CPU 102 next makes a process to produce the installer for the driver program at the step S1905. The CPU 102 activates the installer producing unit 114 to read out the program for the installer executing installation of the program previously stored in the memory 108, thereby adding the driver program stored in the RAM 106 to the installer.

Next, the CPU 102 makes a process to transmit the installer to the client terminal 200 at the step S1906. The CPU 102 activates the driver transmitting unit 115 to transmit using the network I/F unit 105 the installer added with the driver program to the client terminal 200 which got Web access.

As described above, upon reception of the driver program requested by the program request information, the CPU 102 makes a process to make a judgment as to whether the version information of the driver program is new. In the case where the version information of the retrieved driver program is updated compared with the driver program stored in the driver storage unit 117, the CPU 102 transmits to the client terminal 200 the email informing that the drive program is updated.

Therefore, the user can determine update of the driver program upon reception of the email in the case of making a request for the driver program using the client terminal 200, thereby being able to make a judgment as to whether the updated driver program is to be requested, so that the appropriate driver program can be requested and installed. The CPU can transmit the email informing the update status, thereby being able to realize the terminal management system capable of distributing the more appropriate driver program. Furthermore, since such a process is not required that the drive program is previously stored in the driver storage unit 117 of the memory 108 to be retrieved from the data server 400 at each time of the request by the program request information, access load on the data server 400 can be prevented from increasing to result in improve in the reliability.

Furthermore, since the driver reception flag of the driver program list is set to "1" to retrieve the updated driver program at all times and the email informing the update status is transmitted to the client terminal 200, the specific type of driver program can be provided in the case where this specific type of driver program is desired by a corporation as the user, so that the appropriate driver program can be realized along with the desired response.

Fourth Embodiment

A fourth embodiment of this invention is described in detail hereinafter with reference to drawings. The terminal management system 10 according to the third embodiment and that of the fourth embodiment are substantially the same in a structure except a structure of the management server 100.

FIG. 21 is view illustrating a structure of the management server 200. The memory 108 of the management server 100 according to the fourth embodiment further stores an install result receiving unit 122 defined as a program having function of receiving the installation result of the driver program transmitted from the client terminal 200 and an installation log creating unit 123 defined as a program having function of creating a log using the installation result.

Figures 22, 23:
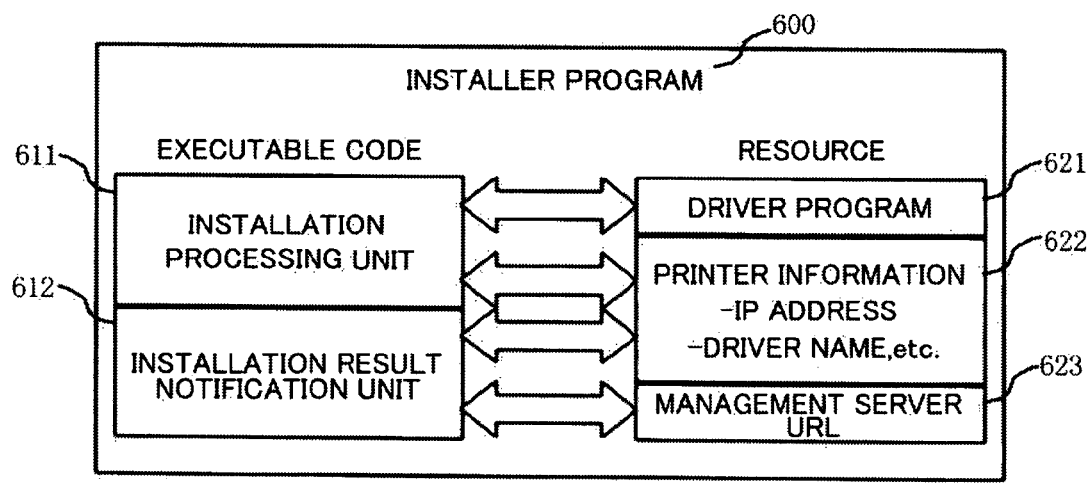
FIG. 22 is a view illustrating a Web page showing information such as installation result according to the fourth embodiment.
FIG. 23 is a view illustrating a structure of a driver program according to the fourth embodiment.

FIG. 23 is a view illustrating a structure of the installer produced by the installer producing unit 114 of the management server 100. A program 600 of this installer composed of an executable code part including an installation processing unit 611 for executing an actual installation process and an installation result notification unit 612 for executing a process for transmitting an installation result to the management server 100, and a resource part including a driver program 621 retrieved from the driver storage unit 117 or the data server 400, printer information 622 including information on the IP address or the like of the printer 300 as the new terminal apparatus, and a management server URL 623 including a URL of the management server 100.

Figure 24:
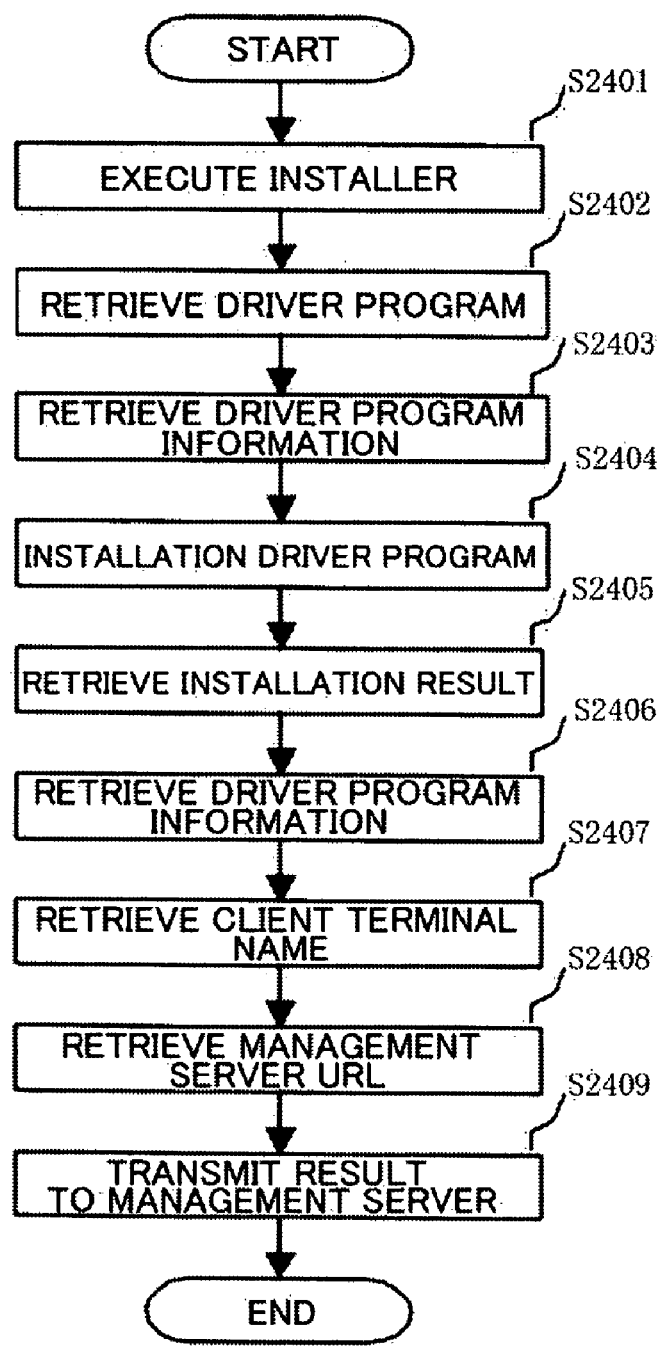
FIG. 24 is a flow chart showing operation of a client terminal according to the fourth embodiment.

Next, operation of the terminal management system 10 according to the fourth embodiment is described in detail with reference to drawings. The terminal management system 10 according to the fourth embodiment and that of the third embodiment are substantially the same in operation except processes subsequent to the step S705 in a process such that the client terminal 200 executes installation using the installer of the driver program, so that those processes will be described in detail with reference to the flow chart shown in FIG. 24. Where the management server 100 transmits the installer 600 added with the driver program at the aforementioned step S705, a CPU 202 of the client terminal 200 starts execution of this installer 600 at the step S2401.

Next, the CPU 202 makes a process to retrieve the driver program 621 from the resource part of the installer 600 at the step S2402. The CPU 202 activates the installation processing unit 611 in the executable code part to search and retrieve the driver program 621 based on a header or the like for identifying the data in the data such as the driver program 621, the printer information 622, and the management server URL 623 in the resource part.

The CPU 202 subsequently makes a process to retrieve the printer information 622 as the object operated by the driver program from the resource part of the installer 600 at the step S2403. For example, the CPU 202 searches and retrieves the printer information 622 based on the header or the like for identifying the data in the data such as the driver program 621, the printer information 622, and the management server URL 623 in the resource part.

At the step S24024, the CPU 202 next installs the retrieved driver program 621 in the predetermined area in the memory 108 of the client terminal 200 to set the driver program 621 in an available state. After the install processing unit 611 installs the driver program 621, the CPU 202 produces information on the installation result. Herein, information of "OK" is produced in the case of successful installation whereas information of "NG" is produced in the case of failed installation, as the result. In the meanwhile, the driver program herein includes not only function of converting image data or the like produced by the client terminal 200 into data in a printable format to execute printing, but also function of producing and setting a port to transmit the image data or the like from the client terminal 200 to the printer 300.

Next, the CPU 202 makes a process to retrieve the installation result at the step S2405. The CPU 202 activates the installation result notification unit 612 in the executable code part to retrieve the result produced by the installation processing unit 611.

The CPU 202 subsequently makes a process to retrieve the information on the driver program at the step S2405. The CPU 202 retrieves from the installed driver program the information on the driver program, such as the OS, emulation, the OS language supported by the driver program.

Next, the CPU 202 makes a process to retrieve the information on the driver program at the step S2406. The CPU 202 retrieves the information on the driver program, such as an OS, emulation, an OS language supported by the driver program from the installed driver program.

The CPU 202 next makes a process to retrieve a name of the client terminal 200 at the step S2407. The CPU 202 retrieves the information of "name" set as the information on the client terminal, from the operation system 209 in the memory 208.

The CPU 202 next makes a process to retrieve the management server URL in the resource part at the step S2408. The CPU 202 then makes a process at the step S2409 to transmit to the management server 100 the information retrieved at the aforementioned steps S2403, S2405, S2406, and S2407.

Figure 25:
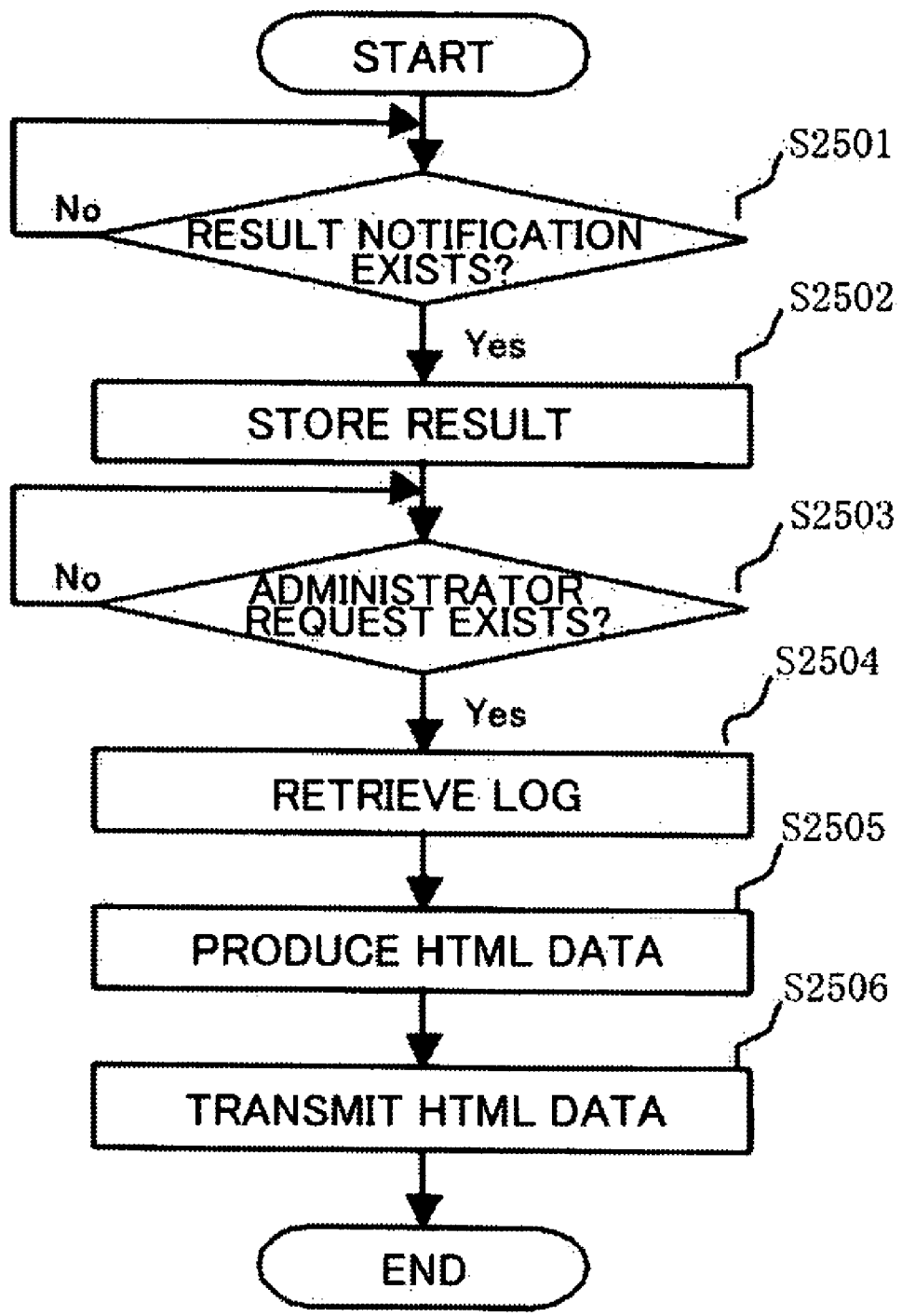
FIG. 25 is a flow chart showing operation of the management server according to the fourth embodiment.

A process to create the log after the management server 100 receives the information on the installation result or the like from the client terminal 200 is described next with reference to a flow chart shown in FIG. 25. First, the CPU 102 of the management server 100 makes a judgment at the step S2501 as to whether the client terminal 200 transmits the information on the installation result or the like at the aforementioned step S2409. In the case of "NO" at the step S2501 in FIG. 25, that is, where the aforementioned information is not yet transmitted, this process is executed repeatedly.

Next, in the case of "YES" at the step S2501, that is, where the aforementioned information on the installation result or the like is already transmitted, the CPU 102 activates the installation receiving unit 122 to store the information in the memory 108 at the step S2502.

Next, the CPU 102 makes a judgment at the step S2503 as to whether the client terminal 200 requests display of the installation result or the like. The CPU 102 makes a judgment as to whether the client terminal 200 gets Web access to the management server 100 to request display the installation result or the like. In the case of "NO" at the step S2503, that is, where there is not any request for display of the installation result or the like, this process is executed repeatedly.

Next, in the case of "YES" at the step S2503, that is, where display of the installation result or the like is requested, the CPU 102 activates the installation log creating unit 123 to read out the information on the installation result or the like stored in the memory 108, at the step S2504.

The CPU 102 subsequently makes a process to produce HTML data at the step S2505. The CPU 102 produces the HTML data for the Web page displaying the read-out information on the installation result or the like, as shown in FIG. 22.

The CPU 102 then makes a process to transmit the HTML data at the step S2506.

The CPU 102 subsequently makes a process to transmit the HTML data at the step S2506. The CPU 102 transmits using the network I/F unit 105 the HTML data for the produced Web page to the client terminal 200 which got Web access. The HTML data received by the client terminal 200 is displayed and output to the output device 204 of the client terminal 200, so that the user confirms the installation result at the sight of this data displayed and output as described above.

As described above, upon reception of the information on the installation result or the like from the client terminal, the CPU 102 stores this information in the memory 108, and process the HTML data for the Web page displaying this information in the case of display request from the client terminal 200, so that the client terminal 200 receives and outputs the aforementioned HTML data.

Therefore, after installing the driver program using the client terminal 200, the user can display the installation result as the Web page for confirmation, thereby being able to realize improvement in the convenience. Furthermore, the operator operating the management server 100 also can grasp installation status of the driver program for the printer 300 as the new terminal with reference to the information on the installation result of the like stored in the memory 108, thereby being able to realize improvement in the convenience.

Other Embodiments

HTTP protocol communication using the Web server is applied in the case where the client terminal 200 gets Web access to the management server 100 in the aforementioned embodiments but this invention is not limited to those embodiments, so that programs stored in the memories 108, 208 of the management server 100 and the client terminal 200 may mutually communicate through a remote procedure call.

The new terminal apparatus is set as the printer 300 in the aforementioned embodiment but may be any other kinds of apparatus such as facsimile machines, scanners, or the like.

The information on the installation results or the like is stored in the memory 108 in the aforementioned embodiment but may be stored in one part of the tree data of the directory service stored in the tree data memorizing unit 501 in the resource server 500.

The management server 100 searches for the appropriate driver program in accordance with the information on the type of OS designated by the program request information in the aforementioned embodiments but this invention is not limited to those embodiments. Upon reception of the information for requesting for the driver program from the client terminal 200, the CPU 102 of the management server 100 may retrieve the information such as a type of PS by having access to the client terminal 200 with reference to the tree data of the directory service in the resource server 500 to produce the installer upon automatic search and selection of the appropriate driver program.

Furthermore, the CPU 102 of the management server 100 previously retrieves the driver program from the data server 400 on a regular basis and activates the driver version comparison unit 121 to make a process to compare the driver program stored in the driver storage unit 117 with the version information on a regular basis. In the case where the version information is newer or updated compared with the driver program stored in the driver storage unit 117, the CPU 102 activates the program for the email transmitting unit 112 to produce and transmit for notification, the email informing that the driver program is new or updated to the client terminal 200. With the structure as described above, the user can install the driver program immediately upon confirmation of the status that the new or updated driver program is retrieved.

The OS, emulation, the OS language and the like supported by the driver program is selected and designated based on the program request information in the aforementioned embodiment, but either one of the printer description languages in plural types used by the printer may be selected and designated in addition.

This invention can be applicable to the terminal management system including the terminal apparatus connected to the local network capable of transmitting and receiving the information, the management server capable of transmitting and receiving the information on the terminal apparatus through the local network, and the client terminal capable of receiving the information on the terminal apparatus from the management server through the local network.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. A terminal management system having a terminal apparatus connected to a local network capable of transmitting and receiving information, a management server capable of transmitting and receiving information relating to said terminal apparatus through said local network, and a client terminal capable of receiving said information relating to said terminal apparatus from said management server through said local network, said management server comprising:
 a terminal searching section for searching for a new terminal apparatus connected to said local network;
 a terminal information transmitting section for transmitting new terminal information relating to said new terminal apparatus searched by said terminal searching section to said client terminal with reference to information relating to said client terminal via an e-mail indicating the status of said new terminal apparatus;
 a driver information requesting section for requesting driver information from a data server connected to an external network different from said local network in response to a request for web access from said client terminal;
 a driver information transmitting section for transmitting the driver information included in a web page to said client terminal;
 a driver requesting section for requesting a driver program for operating said new terminal apparatus to the data server upon reception of a request for the driver program from said client terminal and for not requesting the driver program for operating said new terminal apparatus when not receiving said request for the driver program from said client terminal;
 a driver receiving section for receiving said driver program transmitted from said data server in accordance with said request from said driver requesting section;
 an installer adding section for adding said driver program received by said driver receiving section to an installer; and
 an installer transmitting section for transmitting to said client terminal said installer added with said driver program by said installer adding section, and said client terminal comprising:
 a request information transmitting section for transmitting said request for access to said driver program corresponding to said new terminal apparatus to said management server in accordance with said information relating to said new terminal apparatus transmitted from said management server; and
 an installing section for installing said driver program transmitted from said management server upon execution of said installer for said driver program.

2. The terminal management system according to claim 1, wherein said information relating to said client terminal is stored in a memorizing section included in said management server.

3. The terminal management system according to claim 1, wherein said management server retrieves said information relating to said client terminal from an exterior of said system.

4. The terminal management system according to claim 3, wherein said information relating to said client terminal is stored in a resource server being connected to said local network, and storing information readable by said management server.

5. The terminal management system according to claim 1, wherein said information relating to said new terminal apparatus contains a name of said new terminal apparatus and address information unique to said new terminal apparatus.

6. The terminal management system according to claim 1, wherein said information relating to said client terminal contains information relating to a type of OS installed to said client terminal and information relating to a language of said OS.

7. The terminal management system according to claim 1, wherein said new terminal apparatus connected to said local network is defined as a printer, wherein said information relating to said new terminal apparatus contains multiple types of printer description languages used by said printer, and wherein said request for access transmitted from said client terminal contains information for designating any one of said multiple types of printer description languages.

8. The terminal management system according to claim 1, wherein said client terminal includes a completion transmitting section for transmitting to said management server, information such that said installing section completes installation, and wherein said management server includes a completion result memorizing section for memorizing in a manner to correlate with said installed driver program, said information transmitted from said completion transmitting section.

9. A terminal management system having a terminal apparatus connected to a local network capable of transmitting and receiving information, a management server capable of transmitting and receiving information relating to said terminal apparatus through said local network, a resource server memorizing information readable by said management server, and a client terminal capable of receiving said information relating to said terminal apparatus from said management server through said local network, said resource server memorizing information relating to said client terminal connected to said local network, said management server comprising:
a terminal searching section for searching for said terminal apparatus connected to said local network;
a terminal information transmitting section for transmitting, via an e-mail, new terminal information relating to a new terminal apparatus searched by said terminal searching section to said client terminal with reference to said information relating to said client terminal stored in said resource server;
a driver memorizing section for memorizing a driver program for operating said new terminal apparatus;
a driver information requesting section for requesting driver information from a data server connected to an external network different from said local network in response to a request for web access from said client terminal;

a driver information transmitting section for transmitting the driver information included in a web page to said client terminal;

a driver requesting section for requesting from the data server a type of driver program as requested by a request for the driver program from said client terminal connected to said local network and for not requesting the driver program for operating said new terminal apparatus when not receiving said request for the driver program from said client terminal;

a version judgment section for making a judgment as to a version of said driver program transmitted from said data server;

a version transmitting section for transmitting information relating to a new version to said client terminal in the case where said judgment by said version judgment section indicates that said version of said driver program is newer than that of said driver program in a type requested by said request for access;

a memory judgment section for making a judgment as to whether said driver memorizing section memorizes said driver program requested by said request for access, in accordance with said request for access from said client terminal;

an installer adding section for adding said driver program to said installer by reading said driver program requested by said request for access out of said driver memorizing section in the case where said memory judgment section makes a judgment that said driver memorizing section memorizes said driver program requested by said request for access; and an installer transmitting section for transmitting said installer added with said driver program by said installer adding section to said client terminal, and said client terminal comprising:

a request information transmitting section for transmitting said request for access to said driver program corresponding to said new terminal apparatus to said management server in accordance with said information relating to said new terminal apparatus transmitted from said management server; and an installing section for installing said driver program transmitted from said management server upon execution of said installer for said driver program.

\* \* \* \* \*

UNITED STATES PATENT AND TRADEMARK OFFICE
CERTIFICATE OF CORRECTION

PATENT NO.         : 7,647,395 B2                                    Page 1 of 1
APPLICATION NO.    : 11/488789
DATED              : January 12, 2010
INVENTOR(S)        : Keiichi Sando It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 539 days.

Signed and Sealed this

Sixteenth Day of November, 2010

David J. Kappos
*Director of the United States Patent and Trademark Office*